United States Patent Office
3,087,788
Patented Apr. 30, 1963

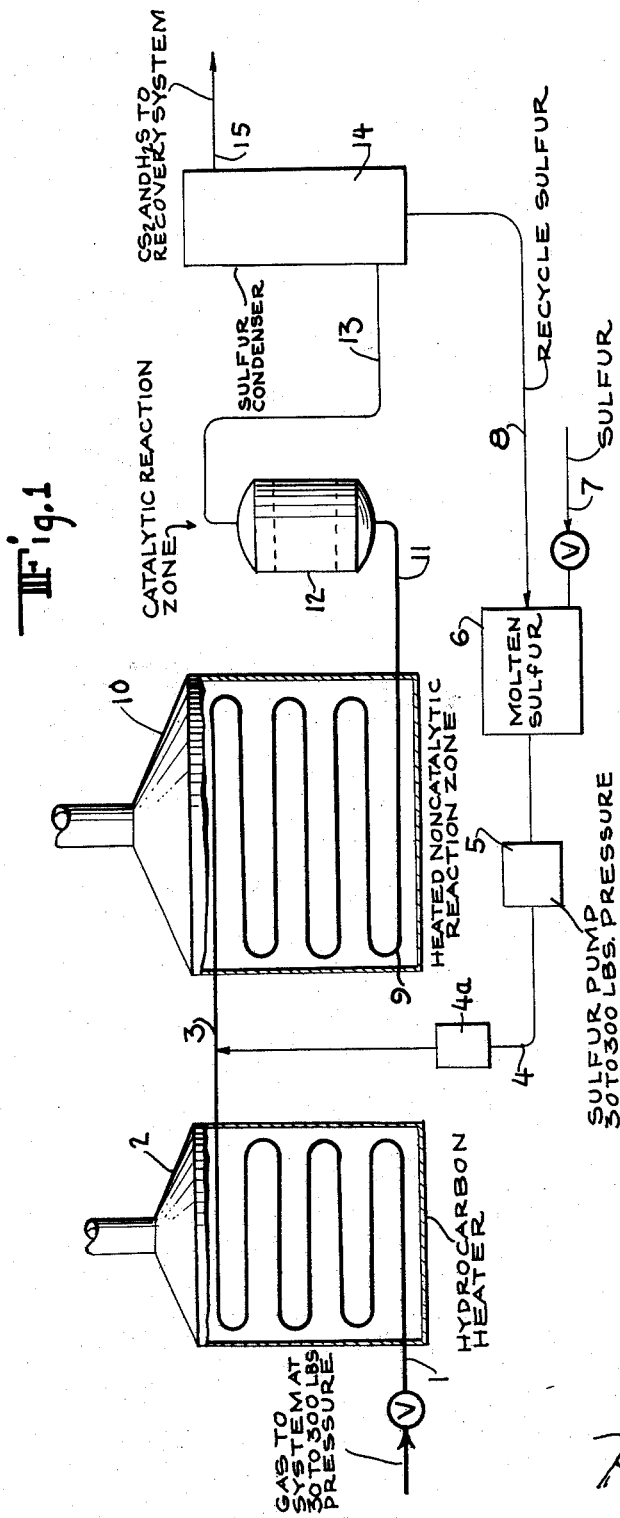

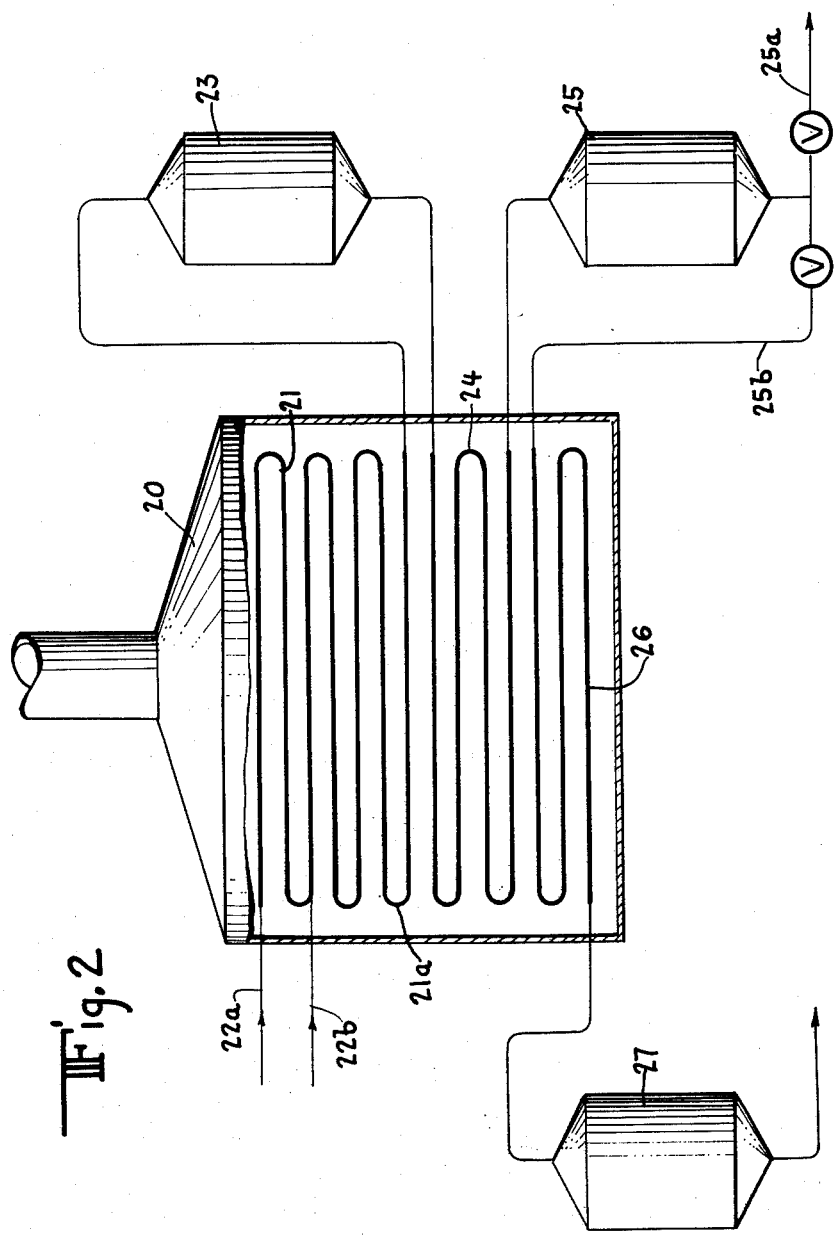

3,087,788
COMBINED CATALYTIC AND NON-CATALYTIC PROCESS OF PRODUCING HYDROGEN SULFIDE AND CARBON DISULFIDE
David J. Porter, Painesville, Ohio, assignor to FMC Corporation, a corporation of Delaware
Filed Apr. 6, 1959, Ser. No. 804,269
2 Claims. (Cl. 23—181)

This invention relates to the production of carbon disulfide by the reaction of sulfur with hydrocarbons in a combined catalytic and non-catalytic reaction.

Various attempts have been made to produce carbon disulfide by the reaction between hydrocarbons and sulfur in vapor phase in the presence of a catalyst promoting the production of carbon disulfide. Numerous catalysts have been proposed and tested for this purpose. Recommended operating temperatures for such processes vary from 350° to approximately 1100° C. With efficient catalysts, carbon disulfide in attractive commercial yields can be produced by this reaction at temperatures between about 450° and 700° C. Such a process is described, for example, in the United States patent to Thacker, No. 2,330,934, October 5, 1943.

The successful operation of a catalyst bed for carbon disulfide production, however, involves several difficulties. Below a temperature of approximately 750° C. the reaction between sulfur vapors and hydrocarbon gas in the presence of a catalyst is endothermic and requires that the catalyst bed either be heated or that the gases be heated to a high temperature above the reacting temperature in the catalyst bed so as to support the reaction in the catalyst bed. The nature of the reaction and the temperature used is such that the catalyst bed frequently becomes fouled or poisoned by the reacting materials or with by-products of the reaction and it is necessary to frequently purge or renew the catalyst.

When the feed gas is predominantly $C_1$ and $C_2$ hydrocarbons, namely, methane and ethane, the reaction progresses with the production of carbon disulfide and hydrogen sulfide and little or no side reaction products result. Difficulty is experienced, however, when a feed stock consisting predominantly of one type of hydrocarbon but containing substantial amounts of hydrocarbons heavier and/or more reactive than the main component is subjected to the same reaction with sulfur. When a feed stock of which the main component is methane, such as natural or manufactured gas, but which contains a minor portion of hydrocarbons having three or more carbon atoms per molecule is reacted with sulfur vapor (or liquid) in the presence of a catalyst to form carbon disulfide, the reaction of the $C_3$ and heavier hydrocarbon fraction of the feed stock to form carbon disulfide is accompanied by the formation of viscous polymeric sulfur-containing compounds. This is due to side reaction products which degrade into tar and coke, leading to decreased catalyst activity, decline in production and difficulties in catalyst regeneration.

Similarly, the presence of substantial amounts of hydrocarbons having three or more carbon atoms per molecule in a hydrocarbon mixture, such as one in which the main component is propane, will tend toward side reactions and tar formation. Consequently, continuous methods for the catalytic preparation of carbon disulfide from hydrocarbon feed stocks containing components which tend to decompose into tar and coke or yield viscous polymers in the presence of sulfur have been beset by inefficiency, catalyst losses and troublesome plugging of equipment.

The plugging of the equipment and/or the loss of catalyst activity due to fouling or other causes normally requires shutting down the plant, opening the catalyst reactor and replacing the catalyst or interrupting the carbon disulfide formation cycle to blow out, burn out or otherwise regenerate the catalyst. The efficiency of the catalyst in operation also varies with changes in its activity during use so that frequent changes in operating conditions are necessary to maintain high yields as the catalyst efficiency changes.

I have discovered that commercial yields of carbon disulfide can be produced by the reaction of sulfur vapor and hydrocarbons under superatmospheric pressure at operating temperatures below 750° C. and preferably above 450° C. without the use of a catalyst and with uniformity when certain conditions of operation are followed, and that when the non-catalytic formation of carbon disulfide by reaction of sulfur vapor and hydrocarbons is combined with, preferably followed by, the use of a catalyst bed reactor the operation of the catalyst bed reactor can be made more uniform and hence more efficient.

I have also discovered that in order to secure conversions of 90% or more, based on the methane converted to carbon disulfide and hydrogen sulfide, in a non-catalytic reaction between hydrocarbons and sulphur at pressures of about 3 atmospheres an uneconomically large reaction space must be provided or an uneconomically low space velocity must be used to secure the required retention time in which the reacting vapors are kept in contact at the reacting temperature and pressure and that high yields of carbon disulfide may be produced more economically if the hydrocarbon gases and sulfur are first reacted at pressures of the order of 30 to 300 lbs. per square inch gauge and temperatures of 450° to 700° C. in a non-catalytic reaction to effect partial conversion of the gases to carbon disulfide and are then further reacted in the presence of a catalyst capable of promoting the formation of carbon disulfide therefrom to form high yields of carbon disulfide. The order of these reactions may, however, be reversed and the catalytic reaction may precede the non-catalytic reaction with the same advantages as hereinafter described.

One of the objects of my invention is, therefore, to use a combined catalytic and non-catalytic process of producing carbon disulfide and hydrogen sulfide by reacting hydrocarbons and sulfur at high pressure and temperature to produce carbon disulfide without the use of a catalyst, and then to pass the partially reacted gases at high temperature through a catalyst bed reactor to produce further reaction or to first pass the hydrocarbons and sulfur vapor through a catalyst bed reaction and then provide for further non-catalytic reaction under superatmospheric pressure in excess of 3 atmospheres.

Another object of my invention is to reduce the overall reaction space required to produce high yields of carbon disulfide by the reaction of hydrocarbons and sulfur by combining a non-catalytic reaction of hydrocarbons and sulfur at pressures of the order of 30 to 300 lbs. per square inch gauge and temperatures of the order of 450° to 700° C. with a catalytic reaction and to control the relative amount of non-catalytic reaction and catalytic reaction by the time the reactants remain in contact under reaction temperature and pressure conditions in the non-catalytic and the catalytic zone of the reactors.

Another object of my invention is to provide a process for producing carbon disulfide by the reaction of hydrocarbons and sulfur vapor which can be operated in an apparatus of simple design and without the necessity of frequent suspension and dismantling of the apparatus for cleaning or renewal of a catalyst bed.

Another object of my invention is to provide a process and apparatus for the production of carbon disulfide by the reaction of hydrocarbons and sulfur in vapor phase which is simple in operation and construction and can be operated over long periods of time without clogging of the catalyst or material diminution in output of carbon disulfide due to decreased catalyst activity.

Another object of my invention is to provide a process for the production of carbon disulfide from sulfur and hydrocarbons by the combined use of a non-catalytic reaction and a catalytic reaction, making use of a catalyst bed reactor, which is simple to operate and flexible to control so that by variation of feed rate, temperature and pressure the process can be readily controlled to produce carbon disulfide at the desired rate without the frequent plugging and stopping of the equipment found in prior catalytic reactor processes.

Another object of my invention is to provide a combined non-catalytic and catalytic process of producing carbon disulfide and hydrogen sulfide by the reaction of sulfur and hydrocarbon in which variations in the reactivity of the catalyst will have less effect on the percentage conversion of methane to carbon disulfide than in a process depending entirely upon catalytic reaction for conversion.

Various other objects and advantages of my invention will appear as this description proceeds.

I have discovered that if the time the reacting hydrocarbons and sulfur vapor are in contact at the desired reacting temperatures is correlated with the pressure on the reacting gases, the percentage conversion of hydrocarbons to carbon disulfide and hydrogen sulfide can be controlled within wide limits to provide substantial conversion of the hydrocarbon and sulfur to carbon disulfide without the use of catalysts and that if the gases partially converted to carbon disulfide in a non-catalytic reaction are then passed through a catalyst bed reactor, a high yield of carbon disulfide may be obtained with less difficulty in operation of the process than if the catalytic process alone is used for carbon disulfide formation.

While, as stated above, the preferred sequence of operation is a non-catalytic reaction followed by a catalytic reaction, it will be understood that this order may be reversed and the catalytic reaction may precede the non-catalytic reaction or the catalytic and non-catalytic reactions may alternate in a series of reactions within the spirit and objects of my invention.

In the catalytic production of carbon disulfide by reaction of hydrocarbons and sulfur vapor at elevated temperatures, the reaction is most generally carried out by passing a mixture of hydrocarbon gases and sulfur vapor over a catalyst selected from the group consisting of activated alumina, silica gel, fuller's earth, bauxite and synthetic silica-alumina. These catalysts may be used alone or in admixture with one or more compounds of metals of groups V, VI, VII and VIII of the periodic table. In addition, various oxides or sulfides of iron, chromium, manganese, molybdenum and vanadium are useful as catalysts or as catalyst promoters when used with the activated alumina, silica gel, fuller's earth, bauxite, or other catalytic material. Activated carbon activated magnesia and other carbon disulfide-forming catalysts may be used.

It is usual to preheat the hydrocarbon gases and sulfur vapor to a temperature between 450° and 700° C., preferably to a temperature of about 650° C., prior to contact with the catalyst and to either heat the catalyst or heat the gases to a sufficiently high temperature that the temperature in the catalyst chamber does not drop below the temperature at which the reaction proceeds at an economical rate.

Space velocities are variable between rather wide limits depending upon the conditions of operation employed and although higher or lower space velocities are operable the preferred range is from 150 to 1500 reciprocal hours. Space velocity in the catalytic reaction is usually defined at the ratio of total volume of gases (sulfur vapor calculated as the $S_2$ modification) at 0° C. and 760 mm. pressure passing over the catalyst per hour to the volume of space which the catalyst occupies. Space velocity is calculated in this manner in the present application with total reaction space volume substituted for catalyst volume.

The catalytic process may be carried out at atmospheric, subatmospheric or superatmospheric pressure and is normally carried out at a low superatmospheric pressure sufficient to propel the reactants and the resulting products, such as $CS_2$ and $H_2S$ through the process lines, reaction chambers and the subsequent product recovery system. For efficient yields the non-catalytic process process must be carried out at pressures of at least two atmospheres (15 p.s.i.g.) and pressures of three to twenty atmospheres or higher are preferred.

Space velocities employed are in general the maximum that will give the desired conversion under the temperature, pressure and catalytic or non-catalytic conditions employed. Reduced space velocity will generally result in higher conversion, other conditions remaining the same, in both the non-catalytic and catalytic reaction. In some cases where the hydrocarbon gases are heated separately from the sulfur vapors the residence time of the hydrocarbon gases at high temperature must be reduced so as to avoid cracking.

I have found that if hydrocarbon gases and sulfur vapor are maintained at the reacting temperature and at pressures of 30 to 300 lbs. per square inch gauge or more for a sufficient length of time they will react to form carbon disulfide in varying amounts depending upon the temperature, pressure and time of contact without passing them through a catalyst bed, and that if the partially reacted hydrocarbons and sulfur vapor are then passed through a catalyst bed, the reaction may be carried to the desired degree of completion in the catalyst bed with much less likelihood of polymer-forming side reactions or tar formation and plugging of the catalyst bed than if the catalyst bed is relied upon for the entire conversion.

I have also found that if the contact time during which the hydrocarbons and the sulfur vapor are maintained under superatmospheric pressure at the reaction temperature, in the absence of a catalyst, is increased, the amount of carbon disulfide formation is also increased and that if the partially reacted hydrocarbons and sulfur vapor are then passed through a catalyst bed, the space velocity through the catalyst bed may be increased over the space velocity in the non-catalytic reaction zone and still get a high yield of carbon disulfide in the total reaction. As stated above, the sequence of these reactions may be reversed without materially affecting the overall efficiency of the process of this invention.

The process of my invention may be practiced in any apparatus in which hydrocarbons and sulfur vapors heated to temperatures of 450° to 700° C. may be subjected to the required pressure and retained in contact for the required length of time and either before or after a non-catalytic reaction period be passed through a catalyst bed. Preferably the process is carried out continuously in apparatus through which the hydrocarbons and sulfur vapor may flow at the desired pressure and temperature and be retained for the required contact time to effect the desired amount of non-catalytic and catalytic reaction. The process may also be carried out in batch operations in which the hydrocarbons and sulfur vapor may be heated and mixed together and retained in contact for the required length of time at the desired pressure, and then contacted with a catalyst. The batch operation, however, except for very limited production, is not recommended.

A convenient way to practice the process of my invention is to pass sulfur vapor and hydrocarbon gases through tubes heated to substantially uniform temperature in which the reacting gases may be subjected to the desired pressure and temperature and retained for the required contact time, and then to pass the heated and partially reacted gases through a catalyst bed reactor. A fluidized catalyst bed may be used or the catalyst may be introduced into the flowing gas stream, but as corrosion and scaling of the equipment affects its life, a fixed catalyst bed is preferred.

Referring now to the drawings which illustrate in diagrammatic embodiment various forms of apparatus suitable for practicing my invention, FIG. 1 is a diagrammatic flow sheet illustrating the practice of the process with one non-catalytic and one catalytic reaction zone.

FIG. 2 is a diagrammatic illustration of another form of apparatus in which the process of this invention may be practiced.

In the apparatus illustrated in FIG. 1, hydrocarbon gas, which is preferably relatively pure methane but may be any hydrocarbon gas, is introduced from the line 1 at the pressure at which the process is to operate, preferably at a pressure from 30 to 300 lbs. per square inch gauge or more if desired. The gas may be heated in heater 2 to a temperature of 450° to 700° C. or higher if desired, and then passes through the line 3 where it is mixed with molten sulfur from the line 4 which is pumped at the desired pressure by pump 5 from the molten sulfur tank 6. Sulfur may be introduced into the tank 6 from the molten sulfur line 7 or as recycled sulfur from the line 8.

The sulfur is preferably vaporized in the line 3 on mixture with the hot hydrocarbon gases or it may be vaporized in a sulfur vaporizer 4a in the line 4. The mixed gas and sulfur vapor pass into the non-catalytic reaction zone which may be of any desired shape but is illustrated as coils of pipe 9 located in a furnace 10 provided with suitable heating means to keep the sulfur and hydrocarbons at the desired temperature in the non-catalytic reaction zone. The length and diameter of the pipe 9 is proportional to the flow of the gases at the desired pressure to provide the amount of contact time necessary to produce the amount of carbon disulfide formation desired in the non-catalytic reaction zone, and after being retained in the non-catalytic reaction zone for the desired length of time, the partially reacted hydrocarbons and sulfur are passed through the line 11 into a catalyst bed reactor 12 containing any suitable carbon disulfide-forming catalyst. After further reaction in the catalyst bed reactor 12, the gases are passed through the line 13 to a sulfur condenser 14 in which the gases are cooled and molten sulfur condensed and returned through the line 8 to the sulfur reservoir 6. The sulfur condenser 14 may be provided with plates or packing and molten sulfur may be flowed countercurrent to the reaction gases to condense and sweep any unreacted sulfur out of the reaction gas stream. Where no catalytic reaction is desired the reactor 12 may contain a non-catalytic porous packing, such as Raschig rings, which act as a filter to remove entrained solids from the hot gas stream before the gases enter the sulfur condenser 14.

From the sulfur condenser 14 the gases containing carbon disulfide, hydrogen sulfide, unreacted hydrocarbons, etc., are passed through the line 15 to a recovery system for the separation and recovery of the constituents thereof.

In this system the non-catalytic reaction in reactor or furnace 10 may be used to provide the major part of the reaction and the catalytic reactor 12 may be used as a cleanup reactor, thereby relieving the catalyst bed of the burden placed upon it in a reaction which is mainly catalytic. Thus the furnace or reactor 10 could be operated to produce an 80 to 95% or higher conversion of the natural gas and sulfur to carbon disulfide and hydrogen sulfide (based upon methane conversion) and the catalytic bed reactor 12 could be used to produce a 5 to 20% conversion.

While I have illustrated only one non-catalytic reaction zone and one catalytic reaction zone in FIG. 1, it will be understood that a plurality of such zones may be used either connected in parallel or in series and that the size and shape of the zones may be varied to give the desired retention time in each of the zones.

In the form of apparatus illustrated diagrammatically in FIG. 2, a heating furnace 20 is provided with a bank of tubes 21 into which sulfur and hydrocarbon gases, such for example as methane, may be introduced. The hydrocarbon gas is preferably introduced through the line 22a and sulfur through the line 22b into the already preheated hydrocarbon gas. The gases flow under the desired pressure through the first bank of tubes 21a where they are heated to the desired temperature and are then introduced into the first reactor 23, which may or may not contain a catalyst promoting the formation of carbon disulfide. In the reactor 23 as well as in the tubes 21a the gases undergo a certain amount of reaction and in the reactor 23 a temperature drop will take place.

From the reactor 23 the gases pass into a second bank of tubes 24 in the furnace 20 in which they are reheated to the desired temperature and from which they are passed into a second reactor 25 where they undergo further reaction. From the reactor 25 the gases may be passed through the line 25a to the recovery system or through the line 25b into a third bank of tubes 26 in the furnace 20, suitable valves being provided for this purpose.

In the tubes 26 the gases are again reheated to the desired temperature and are passed into a third reactor 27 where they undergo a further reaction and, again, a temperature drop. From the reactor 27 the reacted gases may be passed to a recovery system where the carbon disulfide and hydrogen sulfide are separated from the unreacted sulfur and hydrocarbon gases and recovered while the unreacted sulfur and hydrocarbon gases may be recycled to the process. Any desired recovery system may be used. The one described, for example, in United States patent to Folkins et al., No. 2,568,121, dated September 18, 1951, is suitable, but other recovery systems may be used.

As will be described hereafter, the reactors 23, 25 and 27 may or may not contain catalyst beds. One of these reactors may contain a catalyst bed and the other two may be free of catalysts, or two reactors may be catalytic and one non-catalytic.

Where a non-catalytic packing, such as Raschig rings is used in one or more of the reactors, such as reactor 23, these reactors act as a filter means to filter out any solids carried out of the furnace, such as carbonaceous side reaction products or corrosion products before these reaction products reach the catalyst bed reactors. The reactors with non-catalytic packing are, however, easier to clean than the catalytic reactors and require less plant down time for cleaning.

As the higher homologs, such as ethane, propane, butane, pentane, etc., are more reactive than methane, but have greater tendency to produce undesired side reaction products in the catalytic process, which foul the catalyst, it is desirable to react these higher homologs in the non-catalytic stage so that only a small percentage thereof are present in the catalytic stage. In this way a higher percentage of the higher homologs can be tolerated in the initial hydrocarbon gas, without complicating the catalytic stage of the process.

The following examples of my process which are given for the purpose of illustration and not by way of limitation show some of the ways in which my invention may be practiced.

EXAMPLE I

A hydrocarbon gas containing 94.6% methane, 4.1% ethane and 1.3% nitrogen, together with melted sulfur, was passed through a reactor made of a 16½″ length of 6″ inside diameter stainless steel pipe having a surface area of 1.05 sq. ft. per cu. ft of volume and provided with closed ends into which inlet and outlet pipes were connected. The reactor was placed in 4 inches of firebrick inside a furnace provided with means to heat the reactor and the methane and sulfur. The hydrocarbon gas and sulfur were heated separately and were mixed just prior to entry into the reactor. Different ratios of sulfur to carbon were fed into the reactor and different pressures, temperatures and space velocities were used, and reactions between the methane and sulfur carried out under various conditions as set forth below.

Table 1-A

| Run No. | Press. Atm. | $S_2/CH_4$ Ratio | Space Velocity | Temp., °C. | $CH_4$ Conversion, Percent |
|---|---|---|---|---|---|
| 10 | 1.0 | 2.25 | 380 | 606 | 11 |
| 13 | 4.4 | 4.3 | 605 | 635 | 87 |
| 14 | 6.9 | 2.25 | 373 | 594 | 73 |
| 15 | 1.0 | 2.25 | 394 | 606 | 9 |
| 17 | 4.4 | 2.2 | 365 | 636 | 71 |

At this point the reactor was packed with stainless steel turnings so that its ratio of surface to volume was increased to 66.7 sq. ft. per cu. ft. and the following reactions carried out:

Table 1-B

| Run No. | Press. Atm. | $S_2/CH_4$ Ratio | Space Velocity | Temp., °C. | $CH_4$ Conversion, Percent |
|---|---|---|---|---|---|
| 20 | 4.6 | 2.1 | 378 | 599 | 64 |
| 21 | 4.5 | 2.1 | 378 | 632 | 78 |
| 22 | 4.6 | 2.15 | 378 | 622 | 70 |
| 23 | 4.8 | 1.9 | 325 | 624 | 87 |
| 24 | 4.6 | 2.15 | 737 | 613 | 58 |
| 25 | 4.6 | 2.1 | 192 | 650 | 100 |

At this point the steel turnings were removed from the reactor so that the reactor was restored to its original volume and the following reactions were carried out:

Table 1-C

| Run No. | Press. Atm. | $S_2/CH_4$ Ratio | Space Velocity | Temp., °C. | $CH_4$ Conversion, Percent |
|---|---|---|---|---|---|
| 32 | 1.0 | 2.0 | 486 | 624 | 16 |
| 38 | 6.0 | 2.0 | 450 | 635 | 91 |

At this point the pressure and temperature were increased and the following reactions carried out:

Table 1-D

| Run No. | Press. Atm. | $S_2/CH_4$ Ratio | Space Velocity | Temp., °C. | $CH_4$ Conversion, Percent |
|---|---|---|---|---|---|
| 40 | 7.7 | 2.0 | 153 | 662 | 96 |
| 41 | 7.6 | 1.9 | 166 | 652 | 98 |
| 42 | 7.6 | 1.85 | 163 | 662 | 97 |
| 43 | 7.6 | 2.0 | 159 | 670 | 97 |

Space velocity in the above tables is the ratio of total volume of gases (sulfur vapor calculated as the $S_2$ modification) at 0° C. and 760 mm. pressure passing through the reactor per hour to the volume of the reactor.

It will be noted that according to run 25 in order to produce 100% conversion of the methane to carbon disulfide at 4.6 atmospheres pressure and a reaction temperature of 650° C., a space velocity of 192 was used; the sulfur and hydrocarbon feed rates were reduced correspondingly to preserve a sulfur ($S_2$) to methane ratio of 2.1. Such a low space velocity produces high conversion, but is not a preferred operation because of low throughput.

If the incompletely reacted hydrocarbons and sulfur from the above runs are passed through a catalyst bed reactor of the type described in the Thacker Patent No. 2,330,930 or illustrated diagrammatically at 12 in FIG. 1, further conversion of the hydrocarbons and sulfur to carbon disulfide may be made, and the amount of reaction in the non-catalytic zone and in the catalytic zone may be controlled and varied over wide limits. Thus the non-catalytic reaction may be used to convert from about 10 to about 90% of the carbon in the hydrocarbon gas to carbon disulfide and the catalytic reaction may be used to convert from about 90 to about 10% of the carbon in the hydrocarbon gas to carbon disulfide with greater efficiency and economy than if an all-catalytic or all non-catalytic reaction is used.

In run 23 a special lowgrade methane having the compositions $CH_4$ 86.1%, $N_2$ 1.5%, $C_2H_6$ 8.4%, $C_3H_8$ 2.4%, $C_4H_{10}$ 1.0% and $C_5H_{12}$ 0.6%, was used. The conversion yield and the product quality indicate that with the presence of higher homologs in the gas a substantial conversion of the hydrocarbons to carbon disulfides may be made in the non-catalytic zone of the process without the formation of polymerization products and tars, and that in the subsequent passage of these gases through a catalyst bed reactor less fouling of the catalyst and less plugging of the catalyst bed will be encountered.

In run 40 a gas analyzing 94.6% methane, 4.1% ethane and 1.3% nitrogen was used; in run 43 a gas analyzing 99.0% methane and not over 0.5% ethane was used; and in runs 41 and 42 a gas analyzing 86.1% methane, 8.4% ethane, 2.4% propane, 1.0% butane, 0.6% pentane, and 1.5% nitrogen was used. Substantially equal conversion was attained with the pure and impure hydrocarbon gas and analysis of the carbon disulfide produced showed the resulting products to be of high purity in all cases.

It will be appreciated that in reactions of this type it is not possible to maintain exactly the same temperature and other reaction conditions between different runs and that minor variations in yields may be explainable on the basis of variables not under complete control in the various reactions; also that at high conversion levels the methods of analysis are not sufficiently accurate to show minor differences in yields.

EXAMPLE II

A hydrocarbon gas of the analysis of Example I together with melted sulfur was passed through a bank of eight tubes each 6 ft. in length of 1 D Duraloy 28-3 centrifugally cast pipe connected in series and enclosed in a furnace such as illustrated at 10 in FIG. 1. The tubes had a free inside diameter of 1.5 inches and provided a surface area to volume ratio of 32 sq. ft. per cu. ft. The liquid sulfur and hydrocarbon gas were mixed at the inlet to the furnace and the resulting product gas was passed out of the furnace through a manually controlled pressure valve. A sample tap was located so that samples of the product gas emerging from the furnace could be taken. The furnace was heated and thermocouples were used to determine the temperature at various points therein. The sulfur was pumped under various pressures into the furnace and the following results obtained:

Table 2

| Run No. | Press. Atm. | $S_2CH_4$ Ratio | Space Velocity | Temp., °C. | $CH_4$ Conversion, Percent |
|---|---|---|---|---|---|
| 45 | 4.4 | 2.3 | 173 | 680 | 96 |
| 47 | 4.4 | 1.7 | 143 | 630 | 83 |

In the above table, space velocity is determined in the same manner as defined in Example I.

EXAMPLE III

Prepared natural gas, analyzing approximately 86.7% $CH_4$, 5.8% $C_2H_6$, 5.3% $C_3H_8$, 1.0% $C_4H_{10}$ and traces of $C_5$, together with melted sulfur was passed through a non-catalytic reaction zone, such as illustrated at 10, FIG. 1, consisting of 170 linear feet of stainless steel tubes which were 6 inches inside diameter and provided a surface area to volume ratio of 8.0 sq. ft. per cu. ft. The non-catalytic reaction zone was heated so that its temperature could be controlled and varied.

The liquid sulfur and gas were mixed at the inlet to the non-catalytic reaction zone and flowed through tubes 9 in the furnace 10 at a pressure of 3 to 3.4 atmospheres. The rate of sulfur and gas feed was varied to give different space velocity and at lower space velocity higher conversion of the hydrocarbon gas to carbon disulfide was attained. Samples were taken at the outlet from the non-catalytic reaction zone and analyzed and the gases from this zone were flowed from the non-catalytic reaction zone without reheating directly into a catalytic bed reactor, such as indicated at 12, containing a silica gel catalyst and then to a recovery system. The reaction in the non-catalytic reaction zone showed the following:

*Table 3*

Pressure 3 to 3.4 Atmospheres

| Run No. | Feed Ratio, $S_2/CH_4$ | Space Velocity | Vapor Out Temp., °C. | $CH_4$ Conversion, Percent |
|---|---|---|---|---|
| 50 | 2.6 | 206 | 670 | 95 |
| 51 | 2.1 | 177 | 665 | 78 |
| 52 | 2.8 | 217 | 665 | 89 |
| 55 | 2.4 | 296 | 660 | 83 |
| 56 | 2.8 | 326 | 683 | 85 |
| 57 | 2.9 | 394 | 657 | 72 |
| 58 | 2.5 | 399 | 650 | 61 |
| 59 | 2.6 | 405 | 645 | 59 |
| 61 | 2.5 | 260 | 700 | 98 |
| 62 | 2.7 | 416 | 650 | 41 |
| 63 | 2.2 | 365 | 638 | 41 |

Additional conversion in the catalytic reaction zone 12 was as follows:

*Table 4*

Pressure 3 Atmospheres

| Run No. | Feed Ratio, $S_2/CH_4$ | Space Velocity | Catalyst Temp., °C. | Conversion, Percent out | Increase in Percent Conversion |
|---|---|---|---|---|---|
| 50 | 2.6 | 125 | 660 | 97 | 2 |
| 51 | 2.1 | 108 | 660 | 88 | 10 |
| 52 | 2.8 | 132 | 660 | 91 | 2 |
| 55 | 2.4 | 180 | 645 | 97 | 14 |
| 56 | 2.8 | 198 | 670 | 88 | 3 |
| 57 | 2.9 | 239 | 645 | 88 | 16 |
| 58 | 2.5 | 242 | 640 | 84 | 23 |
| 59 | 2.6 | 246 | 627 | 80 | 21 |
| 61 | 2.5 | 158 | 686 | 100 | 2 |
| 62 | 2.7 | 253 | 637 | 79 | 38 |
| 63 | 2.2 | 222 | 618 | 54 | 13 |

The catalyst in the catalytic zone was partially deactivated from previous use, otherwise the conversion in the catalytic zone would have been higher.

The temperature measurements in Table 3 are the outlet temperatures for the non-catalytic reaction zone which varied between 638° and 700° C. There were also uncontrollable variations in the temperatures at the inlet to this zone and in the various portions of the furnace 10 within the zone. The results, however, show that conversion of the hydrocarbon to carbon disulfide in various percentage may be attained by variations in control in the non-catalytic zone, and that further conversion can be secured in the catalytic zone.

EXAMPLE IV

In an operating system substantially as illustrated in FIG. 2, a prepared natural gas containing 98.7% methane, 1.1% ethane, no higher hydrocarbons and 0.2% nitrogen was heated together with sulfur in heater tubes 21a to 615° C. and passed into the reactor 23 which contained no catalyst, at a space velocity of 373 reciprocal hours. The average pressure through the system was 60 lbs. per square inch gauge (5 atm.). In order to prevent longitudinal mixing of the gases in the empty reactor about 25% of the void space in reactor 23 was filled with a non-catalytic porous packing such as Raschig rings. In passing through the heater tubes 21a and reactor 23 a non-catalytic reaction in which 42% of the hydrocarbons were reacted to products $CS_2$ and $H_2S$ occurred with a drop in temperature of 92° C. The gases were then reheated to 630° C. by passing through the heater tubes 24 and passed into reactor 25 containing a silica gel catalyst bed; here the total conversion of the hydrocarbons to $CS_2$ and $H_2S$ was increased to aapproximately 89%. The gases which had cooled to 558° C. were then reheated in tubes 26 to 627° C. and passed into reactor 27 also containing a silica gel catalyst bed, and a total conversion of 96.5% of the hydrocarbons to $CS_2$ and $H_2S$ was secured.

EXAMPLE V

In operating the system such as illustrated in FIG. 2 with non-catalytic (Raschig ring) packing in reactors 23 and 25 and with a silica gel catalyst in reactor 27 at a pressure of 56 lbs. per square inch gauge, a space velocity in each stage of 473 reciprocal hours and an average temperature of 625° C. for the gases passing into the reactors, a non-catalytic conversion of 40% of the hydrocarbons was produced in reactor 23, a non-catalytic conversion of 77% was produced in reactor 25 and in the cleanup catalytic reaction in reactor 27 a total conversion of 95% of the hydrocarbons to $CS_2$ and $H_2S$ was produced. With different space velocities, different temperatures and different operating pressures the amount of catalytic and non-catalytic conversion can be controlled over wide variations if desired.

EXAMPLE VI

In operating the system illustrated in FIG. 2 with a silica gel catalyst in reactor 23 and non-catalytic (Raschig rings) packing in reactors 25 and 27 at a pressure of 65 lbs. per square inch gauge in reactors 23 and 25 and 53 lbs. in reactor 27, inlet gas temperatures of 590° C., 630° C. and 630° C. into the respective reactors 23, 25 and 27, and a space velocity per stage of 540 reciprocal hours, a catalytic conversion of 44% was produced in reactor 23. In reactor 25 a non-catalytic reaction increased the percent conversion to 79 and in reactor 27 a non-catalytic reaction increased the conversion to 92%.

Where the non-catalytic operation had been conducted to produce conversions of 90% or more of the hydrocarbons to carbon disulfide, the amount of further conversion in the catalyst bed is necessarily of the order of from a few percent to 10%. In all instances it is possible to increase the conversion from the percent attained in the non-catalytic operation of the process if the proper temperature and reaction time is maintained in the catalytic reaction zone or zones or to increase the conversion in a non-catalytic zone if there has been a previous partial conversion in a catalytic zone. It is not always economical, however, to operate the process to attain 100% conversion in either or both zones as the lowered space velocity to produce high yields also decreases the throughput and therefore reduces the total yield; also the higher temperatures necessary to attain high conversion in a single pass through a heater and reactor decrease the life of the equipment.

In the above examples space velocity is the ratio of the total volume of gases, sulfur assumed to be $S_2$, at 0° C. and 760 mm. Hg pressure passing through the apparatus per hour, to the volume of each stage of the apparatus. Since Examples IV, V and VI include three stages, the overall space velocity would be one-third of the individual stage velocities given in these examples. Overall space velocities, based on total volume of the reaction apparatus, may be between about 50 and 1500 reciprocal hours, but the preferred range of operation in the embodiment of FIG. 2 is between 120 and 250 reciprocal hours.

Pressures of above 3 atmospheres are necessary in the non-catalytic stage to attain the desired rate of conversion and pressures up to 20 atmospheres or higher are desirable as this increases the amount of reactants in contact in a given reaction space and thereby increases the reaction rate.

While Examples IV, V and VI utilized three reaction stages of equal volume, I do not restrict myself to multiple reactors of equal volume, and hence of equal space velocity. The reaction zones may be of any relative size, as determined by the particular conditions of each installation.

It will be noted from Tables 3 and 4 that as the space velocity is increased the non-catalytic conversion decreases, all other variables being held constant, however, total productivity increases with an increase in the space velocity. A higher space velocity may be used in the catalytic reaction, and high conversion yields obtained, than in the non-catalytic reaction. For optimum economical production of carbon disulfide in a combined non-catalytic and catalytic reaction of hydrocarbons and sulfur, the optimum balance between decreasing conversion due to increased space velocity and increased productivity due to the increased space velocity, or increased throughput, must be established for each operation. Higher pressures assist in maintaining the desired economic balance.

Generally a contact time of from 0.0014 hour to 0.0065 hour is necessary to produce a conversion of 41 to 75% of the hydrocarbons to sulfur compounds at a pressure of 30 lbs. per square inch gauge in the non-catalytic reaction. Higher pressures, of the order of 50 lbs. to 300 lbs. per square inch gauge, may be used and the effect of the higher pressure is to increase the contact time. At a pressure of 200 lbs. per square inch a contact time of 0.0028 hour (about 13 seconds) will produce approximately 95% conversion of methane to carbon disulfide and hydrogen sulfide in a non-catalytic reaction.

While it is preferable to maintain the temperatures between 450° and 700° C., any temperature range from 350° to 1100° C. may be used.

In general, I have found that an increase in temperature and pressure for the non-catalytic reaction produces an increase in conversion yield and that an increase in the time during which sulfur vapors and the hydrocarbons are in contact with a constant temperature and pressure in the non-catalytic zone produces an increase in the carbon disulfide yield; also that an increase in temperature or contact time or pressure increases the conversion in the catalyst zone, the activity of the catalyst remaining the same.

The fact that high yields of carbon disulfide can be produced by the reaction of sulfur and hydrocarbons at temperatures between 450° and 700° C. and at pressures of 30 lbs. per square inch gauge and upward without the use of a catalyst is surprising in view of prior work on the reaction of sulfur and hydrocarbons to produce carbon disulfide in the presence of a catalyst, and the combination of the non-catalytic reaction under pressure with the catalytic reaction provides a process which is more readily controllable and operates under standardized conditions without material variation or diminution of catalyst activity.

The design of the apparatus for this purpose is relatively simple and can be widely varied from that described and the operation and maintenance of the apparatus and control of the process is much simpler than the operation and maintenance of a process and apparatus depending solely on the use of catalyst beds through which the heated reacting gases must pass prior to any material conversion of the hydrocarbons and sulfur to carbon disulfide.

While a single straight non-catalytic reaction chamber having the desired volume and suitably heated may be used in place of tubular non-catalytic reactors illustrated in FIG. 1, the use of a tortuous passage with frequent reversal of flow such as provided by interconnected stainless steel tubes promotes better contact between the gases, prevents channeling and provides more uniform heat distribution.

By simply increasing or decreasing the rate of flow of sulfur and hydrocarbons through the catalytic and non-catalytic reaction zones, maintained at a substantially constant temperature and pressure, the yield of carbon disulfide can be varied and controlled. Likewise, an increase or decrease of pressure or temperature while maintaining a constant flow rate of sulfur and hydrocarbons will vary the yield of carbon disulfide.

As a source of hydrocarbons I prefer to use relatively pure methane or natural gas having a high methane content, but methane having substantial amounts of higher hydrocarbons therein may also be used, and the conversion in the non-catalytic reaction zone reduces the amount of polymeric and tar-forming products formed and therefore reduces the fouling and clogging of the catalyst bed.

The sulfur vapor and hydrocarbon gases are preferably fed to the apparatus in such proportions as to provide a molar ratio of sulfur to methane in excess of 4 to 1, and the excess sulfur is recovered from the exit gases and recycled to the process.

The fact that the tubes of the reactors described in Example III and illustrated in FIG. 1 and the tubes of furnace 20 in FIG. 2 are maintained at a high temperature and with a relatively high flow of gas therethrough provides a self-cleaning action so that clogging and stoppage of the apparatus is practically eliminated.

The reactors are preferably constructed of stainless steel to better resist the corrosive action of the sulfur vapors, although ordinary steel or lined tubes may be used.

While the reactions in the non-catalytic reaction zone are described as non-catalytic reactions to distinguish from the reaction in the catalyst beds in the catalytic reaction zone and are believed by me to be non-catalytic, I do not exclude the possibility of catalytic reaction occurring between the walls of the reactors in the non-catalytic reaction zone and the gases flowing therethrough, although various tests of the reaction in the non-catalytic reaction zone indicate that the reaction is not catalytic.

While I have described certain tests as illustrative examples, it will be understood that my invention is not limited thereto and that the invention may be practiced in many different ways and in many different types of apparatus over that described and that various modifications and changes in operating conditions, control, etc., may be made within the spirit of my invention and the scope of the following claims.

This application is a continuation-in-part of application Serial No. 448,741, filed August 9, 1954, now Patent No. 2,882,130.

I claim:

1. The method of producing carbon disulfide from hydrocarbon gas and sulfur which comprises partially reacting hydrocarbons and sulfur in a catalytic reaction at a pressure between 30 and 300 lbs. per square inch and a temperature between 400° and 750° C. to produce carbon disulfide, reheating the reaction products to a temperature between 400° and 750° C. and further reacting said gases in which from about 10 to about 90% of the carbon in the hydrocarbon gas has been reacted to produce carbon disulfide, at a pressure in excess of 30 lbs. per square inch in a non-catalytic reaction to form more carbon disulfide therein.

2. The method of producing carbon disulfide by reaction of sulfur and hydrocarbons which comprises contacting sulfur vapor and hydrocarbon gases at temperatures between 450° and 700° C., maintaining a pressure in excess of 30 lbs. per square inch gauge on said gases and maintaining said gases in contact with each other between 10 seconds and 1 minute to cause the formation of carbon disulfide and hydrogen sulfide in the presence of a carbon disulfide-forming catalyst, and then reheating said gases to a temperature between 450° and 700° C. and maintaining a pressure in excess of 30 lbs. per square inch gauge to form more carbon disulfide therefrom in the absence of a catalyst.

References Cited in the file of this patent

UNITED STATES PATENTS

| | | |
|---|---|---|
| 1,735,409 | Pier et al. | Nov. 12, 1929 |
| 2,187,393 | De Sims | Jan. 16, 1940 |
| 2,207,494 | Viktora | July 9, 1940 |
| 2,428,727 | Thacker | Oct. 7, 1949 |
| 2,492,719 | Thacker | Dec. 27, 1949 |
| 2,653,859 | Glaeser | Sept. 29, 1953 |
| 2,666,690 | Folkins et al. | Jan. 19, 1954 |
| 2,668,752 | Folkins et al. | Feb. 9, 1954 |
| 2,709,639 | Folkins et al. | May 31, 1955 |
| 2,712,984 | Gulbert | July 12, 1955 |
| 2,882,130 | Porter | Apr. 14, 1959 |

FOREIGN PATENTS

| | | |
|---|---|---|
| 265,994 | Great Britain | Oct. 27, 1927 |